(12) United States Patent
Glugla et al.

(10) Patent No.: US 9,004,046 B2
(45) Date of Patent: Apr. 14, 2015

(54) SYSTEM AND METHOD TO IDENTIFY AMBIENT CONDITIONS

(71) Applicant: Ford Global Technologies, LLC, Dearborn, MI (US)

(72) Inventors: Chris Paul Glugla, Macomb, MI (US); Ken Jahr, West Bloomfield, MI (US); Shuya Shark Yamada, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 13/672,571

(22) Filed: Nov. 8, 2012

(65) Prior Publication Data

US 2014/0123963 A1 May 8, 2014

(51) Int. Cl.

| | |
|---|---|
| F02M 15/00 | (2006.01) |
| F02M 25/022 | (2006.01) |
| F02M 35/08 | (2006.01) |
| F02D 29/02 | (2006.01) |
| F02B 29/04 | (2006.01) |
| F02M 25/07 | (2006.01) |
| B60W 10/06 | (2006.01) |
| B60W 10/10 | (2012.01) |
| F02D 41/02 | (2006.01) |
| F02D 41/00 | (2006.01) |

(52) U.S. Cl.
CPC ........ *F02M 25/0227* (2013.01); *F02B 29/0425* (2013.01); *F02B 29/0437* (2013.01); *F02B 29/0468* (2013.01); *F02M 25/0709* (2013.01); *F02M 25/0727* (2013.01); *F02M 35/088* (2013.01); *F02D 29/02* (2013.01); *B60W 10/06* (2013.01); *B60W 10/10* (2013.01); *F02D 41/021* (2013.01); *F02D 41/0002* (2013.01); *F02D 2200/0418* (2013.01); *Y02T 10/146* (2013.01); *Y02T 10/121* (2013.01)

(58) Field of Classification Search
CPC ............. F02B 29/0443; F02B 29/0475; F02B 29/0493; F02B 29/0462; F01P 2060/02
USPC .......................................................... 123/542
See application file for complete search history.

(56) References Cited

U.S. PATENT DOCUMENTS

| | | | |
|---|---|---|---|
| 6,024,669 A | * 2/2000 | Iwatsuki et al. | ............... 477/107 |
| 6,681,171 B2 | 1/2004 | Rimnac et al. | |
| 6,725,848 B2 | 4/2004 | Ramamurthy et al. | |
| 7,007,680 B2 | 3/2006 | Tussing et al. | |
| 2008/0264619 A1 | * 10/2008 | Velte et al. | ..................... 165/167 |
| 2010/0229548 A1 | * 9/2010 | Kardos | ........................... 60/599 |

(Continued)

OTHER PUBLICATIONS

Styles, Daniel Joseph et al., "Charge Air Cooler (CAC) Corrosion Reduction Utilizing Grille Shutters," U.S. Appl. No. 13/656,524, filed Oct. 19, 2012, 33 pages.

(Continued)

*Primary Examiner* — Lindsay Low
*Assistant Examiner* — Charles Brauch
(74) *Attorney, Agent, or Firm* — Julia Voutyras; Alleman Hall McCoy Russell & Tuttle LLP

(57) ABSTRACT

Methods and systems are provided for estimating an ambient humidity value used to determine condensate formation in a charge air cooler. The ambient humidity value is determined from charge air cooler efficiency and windshield wiper speed thresholds. The humidity value is used to calculate an amount of condensate in a charge air cooler and control engine systems to reduce condensate formation and engine misfire.

20 Claims, 4 Drawing Sheets

(56) References Cited

U.S. PATENT DOCUMENTS

| | | |
|---|---|---|
| 2011/0023855 A1* | 2/2011 | Van Nieuwstadt et al. ... 123/703 |
| 2011/0107760 A1* | 5/2011 | Quinn et al. .................... 60/599 |
| 2011/0162596 A1* | 7/2011 | Kardos et al. ............. 123/41.02 |
| 2012/0012088 A1 | 1/2012 | Jung |
| 2012/0090584 A1 | 4/2012 | Jung |

OTHER PUBLICATIONS

Surnilla, Gopichandra et al., "Engine Control Coordination with Grille Shutter Adjustment and Ambient Conditions," U.S. Appl. No. 13/656,542, filed Oct. 19, 2012, 33 pages.

Norman, Kristofor Robert et al., "Pilot Downshifting System and Method," U.S. Appl. No. 13/672,604, filed Nov. 8, 2012, 39 pages.

Glugla, Chris Paul et al., "Method and System to Control Vehicle Operation," U.S. Appl. No. 13/672,593, filed Nov. 8, 2012, 44 pages.

Smith, Craig Alan et al., "Charge Air Cooler Component Diagnostics," U.S. Appl. No. 13/706,090, filed Dec. 5, 2012, 31 pages.

Glugla, Chris Paul et al., "Controlled Transient Acceleration to Evacuate Condensate from a Charge Air Cooler," U.S. Appl. No. 13/708,831, filed Dec. 7, 2012, 27 pages.

* cited by examiner

SYSTEM AND METHOD TO IDENTIFY AMBIENT CONDITIONS

BACKGROUND/SUMMARY

Turbo charged engines may utilize a Charge Air Cooler (CAC) to cool compressed air from the turbocharger before the compressed air enters the engine. Condensate may form in the CAC depending on the amount of cooling and humidity of the intake air, especially during humid or rainy weather conditions, as the intake air is cooled below the water dew point. When the intake air includes recirculated exhaust gasses, the condensate can become acidic and corrode the CAC housing. The corrosion can lead to leaks between the air charge, the atmosphere, and possibly the coolant in the case of water-to-air coolers. Condensate may accumulate in the CAC, and then be drawn into the engine at once during times of increased air mass flow, increasing the chance of engine misfire.

Other attempts to address condensate formation include restricting intake air travelling through the CAC or restricting cooling ambient air flow to the CAC. One example approach is shown by Craig et al. in U.S. Pat. No. 6,408,831. Therein, the intake air temperature is controlled by an ambient air flow restriction system and an intake air flow restriction system. A controller defines the position of these restriction devices in response to ambient temperatures and atmospheric temperature and humidity.

However, the inventors herein have recognized potential issues with such systems. Specifically, the above control systems in response to ambient air temperature and humidity may reduce condensate in some situations; however, these variables may not accurately track the level of condensate in the CAC. Additionally, not all vehicles may be equipped with humidity sensors. Thus, control systems as described above may be adjusted using other variables which may not accurately estimate condensate formation of the CAC. Therefore, condensate formation and engine misfire may not be adequately reduced.

In one example, the issues described above may be addressed by a method for adjusting an operating parameter, such as grille shutters or CAC purging operations, in response to condensate formation in a CAC. The condensate formation may be based on ambient humidity and the humidity may be based on CAC efficiency. In this way, a more accurate CAC condensate level may be determined and used to control other engine systems to reduce condensate formation and engine misfire.

As one example, in response to a CAC condensate level, engine operating parameters may be adjusted. Adjusting engine operating parameters may include adjusting a grille shutter system, an electric fan, and airflow through the CAC. Airflow through the CAC may be adjusted by increasing the opening of an intake throttle, adjusting a valve of a variable volume CAC, and/or downshifting a transmission gear. The amount of condensate in the CAC may also be used to initiate CAC condensate purging operations and control transmission gear downshifting operations to reduce engine misfire. The CAC condensate level may be based on ambient humidity which may be determined from CAC efficiency. In one example, when CAC efficiency is greater than a threshold, a higher humidity value may be set, inferring the presence of rain. In another example, when CAC efficiency is less than a threshold, a lower humidity value may be set. The higher humidity value may be substantially 100%, while the lower humidity value may be less than the higher humidity value. CAC efficiency may be based on CAC inlet and outlet temperature, such when the vehicle speed is greater than a threshold to provide sufficient flow across the CAC. Additionally, the humidity value may be estimated to the higher humidity value when windshield wiper speed is above a threshold speed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
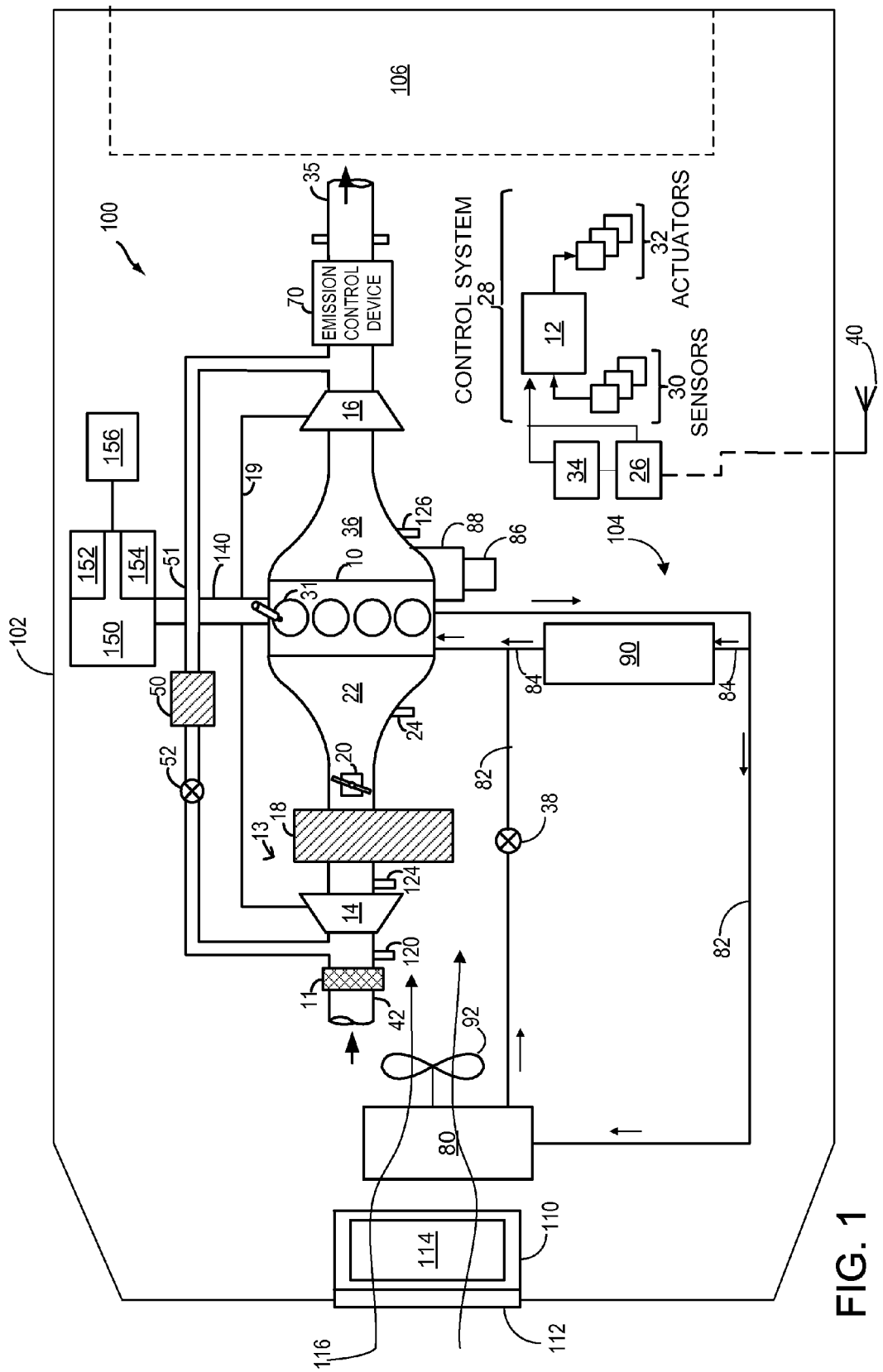
FIG. 1 is a schematic diagram of an example engine system including a charge air cooler.

The following description relates to systems and methods for estimating ambient humidity using efficiency of a charge air cooler (CAC), located in an engine system, such as the system of FIG. 1. Ambient humidity values may be used in a condensate model, shown in FIG. 2, to determine condensate formation in the CAC. Condensate formation information may then be used to adjust engine actuators and initiate engine control routines to reduce condensate formation and engine misfire. The condensate model may be modified by a method for determining a more accurate humidity value, such as the method at FIG. 3. Windshield wiper speed may be used to confirm high humidity values and infer the presence of rain. FIG. 4 presents example engine actuator adjustments in response to condensate formation, based on the humidity value inferred from CAC efficiency and wiper speed.

FIG. 1 shows an example embodiment of an engine system 100, in a motor vehicle 102, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the depicted embodiment, engine 10 is a boosted engine coupled to a turbocharger 13 including a compressor 14 driven by a turbine 16. Specifically, fresh air is introduced along intake passage 42 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve 20. The CAC may be an air-to-air or air-to-water heat exchanger, for example. Throttle valve 20 is coupled to engine intake manifold 22. From the compressor, the hot compressed air charge enters the inlet of the CAC 18, cools as it travels through the CAC, and then exits to pass through the throttle valve to the intake manifold. Ambient air flow 116 from outside the vehicle may enter engine 10 through a grille 112 at a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Additionally, condensate may collect at the bottom of the CAC, and then be drawn into the engine at once during acceleration (or tip-in) increasing the chance of engine misfire. Thus, as elaborated herein with reference to FIGS. 2-4, condensate formation in the CAC may be calculated and used to adjust other engine system components to control condensate formation and reduce the chance of engine misfire.

CAC 18 may also be a variable volume CAC. In this case, the CAC 18 may include a valve to selectively modulate the amount and flow velocity of intake air traveling through the charge air cooler 18 in response to condensation formation within the charge air cooler as well as engine load conditions. By adjusting the valve, airflow through different sections of the CAC may be increased, purging condensate from those sections of the CAC. Airflow through the CAC may be further increased by increasing the opening of the throttle valve 20.

Various purging procedures may be implemented to remove condensate from the CAC. By increasing airflow through the CAC, condensate may be stripped from inside the CAC and into the engine. The CAC may be automatically purged during vehicle driving conditions which increase air mass flow and airflow through the CAC, such as a tip-in. Downshifting a transmission gear may also increase airflow (described further below with reference to transmission system 150). During a deceleration event, condensate may be purged from the CAC by increasing airflow by opening the throttle and/or downshifting a transmission gear. By downshifting a transmission gear during the deceleration event, engine speed may increase, increasing airflow. Thus, condensate may be purged from the CAC during a deceleration event, reducing the chance of engine misfire. In another example, condensate may be purged from the CAC using a periodic, pro-active condensate clean-out cycle. The clean-out cycle may be performed in response to condensate level in the CAC and other system variables. During the clean-out cycle, airflow through the CAC may be increased to purge condensate while engine actuators are adjusted to maintain torque and improve engine performance.

In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 31 through a series of intake valves (not shown). Each combustion chamber of engine 10 may include combustion chamber walls with a piston (not shown) positioned therein. The pistons may be coupled to a crankshaft 140 so that reciprocating motion of the piston is translated into rotational motion of the crankshaft. Crankshaft 140 may be coupled to at least one drive wheel of a vehicle via an intermediate transmission system 150. The transmission system 150 may include a multiple fixed gear automatic transmission having a plurality of discrete gear ratios, clutches, etc. In one example, the transmission may have only 8 discrete forward gears and 1 reverse gear. Further, a starter motor may be coupled to crankshaft 140 via a flywheel to enable a starting operation of engine 10.

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have six available gears, where transmission gear six (transmission sixth gear) is the highest available gear and transmission gear one (transmission first gear) is the lowest available gear. In other embodiments, the vehicle may have more or less than six available gears.

A controller may vary the transmission gear (e.g., upshift or downshift the transmission gear) to adjust an amount of torque conveyed across the transmission and torque converter to vehicle wheels 156 (that is, an engine shaft output torque). As the vehicle downshifts a transmission gear, the engine speed increases. This, along with concomitant opening of the throttle, increases the air mass flow rate (e.g., air mass flow or mass air flow) through the engine. As such, at lower gears, the air mass flow increases. Air mass flow may further increase during a multiple gear downshift. The controller may measure air mass flow from a mass air flow (MAF) sensor 120, which can approximate the airflow through a charge air cooler. As such, air mass flow increase, airflow through the CAC increases. The controller may then use this information to control other engine components and processes, such as gear shifting.

The combustion chambers 31 are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and improved performance.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant may be regulated by a thermostat valve 38, located in the cooling line 82, which may be kept closed until the coolant reaches a threshold temperature.

Engine system 100 may include an electric fan 92 for directing cooling airflow toward the CAC 18, engine cooling system 104, or other engine system components. In some embodiments, electric fan 92 may be an engine cooling fan. The engine cooling fan may be coupled to radiator 80 in order to maintain airflow through radiator 80 when vehicle motor 102 is moving slowly or stopped while the engine is running. Fan rotation speed or direction may be controlled by a controller 12. In one example, the engine cooling fan may also direct cooling airflow toward CAC 18. Alternatively, electric fan 92 may be coupled to the engine accessory drive system, driven by the engine crankshaft. In other embodiments, electric fan 92 may act as a dedicated CAC fan. In this embodiment, the electric fan may be coupled to the CAC or placed in a location to direct airflow directly toward the CAC. In yet another embodiment, there may be two or more electric fans. For example, one may be coupled to the radiator (as shown) for engine cooling, while the other may be coupled elsewhere to direct cooling air directly toward the CAC. In this example, the two or more electric fans may be controlled separately (e.g., at different rotation speeds) to provide cooling to their respective components.

Coolant may flow through coolant line 82, as described above, and/or through coolant line 84 to heater core 90 where the heat may be transferred to passenger compartment 106, and the coolant flows back to engine 10. In some examples, engine-driven water pump 86 may operate to circulate the coolant through both coolant lines 82 and 84.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input, brake input, transmission selector position, vehicle speed, engine speed, mass airflow through the engine, boost pressure, ambient temperature, ambient humidity, intake air temperature, fan speed, etc.), cooling system sensors (such as coolant temperature, fan speed, passenger compartment temperature, ambient humidity, etc.), CAC 18 sensors (such as CAC inlet air temperature and pressure, CAC outlet air temperature and pressure, etc.), and others. In addition, controller 12 may receive data from the GPS 34 and/or an in-vehicle communications and entertainment system 26 of vehicle motor 102.

The in-vehicle communications and entertainment system 26 may communicate with a wireless communication device 40 via various wireless protocols, such as wireless networks, cell tower transmissions, and/or combinations thereof. Data obtained from the in-vehicle communications and entertainment system 26 may include real-time and forecasted weather conditions. Weather conditions, such as temperature, precipitation (e.g., rain, snow, hail, etc.), and humidity, may be obtained through various wireless communication device applications and weather-forecasting websites. Data obtained from the in-vehicle communications and entertainment system may include current and predicted weather conditions for the current location, as well as future locations along a planned travel route.

In other embodiments, the presence of rain may be inferred from other signals or sensors (e.g., rain sensors). In one example, rain may be inferred from a vehicle windshield wiper on/off signal. Specially, in one example, when the windshield wipers are on, a signal may be sent to controller 12 to indicate rain. The controller may use this information to predict the likelihood of condensate formation in the CAC and adjust vehicle actuators, such as electric fan 92 and/or grille shutter system 110.

Furthermore, controller 12 may communicate with various actuators 32, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

As noted herein, the amount of waste heat transferred to the coolant from the engine may vary with operating conditions, thereby affecting the amount of heat transferred to the airflows. For example, as engine output torque, or fuel flow, is reduced, the amount of waste heat generated may be proportionally reduced.

Motor vehicle 102 further includes a grille 112 providing an opening (e.g., a grille opening, a bumper opening, etc.) for receiving ambient air flow 116 through or near the front end of the vehicle and into the engine compartment. Such ambient air flow 116 may then be utilized by radiator 80, electric fan 92, and other components to keep the engine and/or transmission cool. Further, the ambient air flow 116 may reject heat from the vehicle air conditioning system and can improve performance of turbo-charged/super-charged engines that are equipped with CAC 18 that reduces the temperature of the air that goes into the intake manifold/engine. The electric fan 92 may be adjusted to further increase or decrease the air flow to the engine components. Furthermore, a dedicated CAC fan may be included in the engine system and used to increase or decrease air flow to the CAC.

Grille shutter system 110 comprises one or more grille shutters 114 configured to adjust the amount of air flow received through grille 112. Grille shutters 114 may cover a front region of the vehicle spanning from just below the hood to the bottom of the bumper, for example. By covering the CAC intake, drag is reduced and entry of external cooling air into the CAC is reduced. In some embodiments, all grille shutters may be moved in coordination by the controller. In other embodiments, grille shutters may be divided into sub-regions and the controller may adjust opening/closing of each region independently. Each sub-region may contain one or more grille shutters. Grille shutters 114 are moveable between an opened position and a closed position, and may be maintained at either position or a plurality of intermediate positions thereof.

By adjusting different engine controls or operating parameters, such as grille shutter opening and electric fan operation, the controller may adjust the efficiency of the CAC. CAC efficiency may be a measure of how effectively the CAC is cooling the charge air. For example, a high CAC efficiency may indicate increased cooling of the charge air and result in a lower CAC outlet temperature. Alternatively, a low CAC efficiency may indicate decreased cooling of the charge air and result in a higher CAC outlet temperature. As CAC efficiency increases and the outlet temperature at the CAC outlet decreases, condensate formation may increase in the CAC.

Condensate formation may increase during high humidity conditions, such as rain. This is a result of the rain/humidity increasing the cooling efficiency of the CAC. Thus, CAC efficiency may be used to infer the presence of rain and high humidity. Similarly, windshield wiper speed may also indicate rain and be used to infer high humidity conditions. In another example, the windshield wiper on/off signal may indicate the presence of rain. Windshield wiper speed and CAC efficiency may be used to set an ambient humidity value used to determine condensate formation in the CAC. Vehicles may also be equipped with rain sensors coupled to the wiper motor where wiper motor speed is a function of rain intensity and may also be used to infer humidity and CAC effectiveness.

Condensate formation may be a rate of condensate formation or an amount of condensate in the CAC. The amount or level of condensate in the CAC may be determined, based on engine operating conditions. These may include air mass flow, ambient temperature and pressure, CAC temperatures and pressures (e.g., at the CAC inlet and outlet), an EGR amount, humidity, and engine load. The condensate level may be estimated using a combination of the above conditions and/or calculated using a condensate model. Details on these methods are presented in detail below with reference to FIGS. 2-3. The condensate model, presented at FIG. 2, uses ambient humidity to calculate the level of condensate in the CAC. Humidity may be determined from a humidity sensor or assumed to be 100%, if a humidity sensor is not available. However, this may overestimate the condensate formation in the CAC during low humidity weather conditions. Thus, in some examples, when adjusting engine actuators, systems, or operating parameters in response to an amount of condensate, adjustments may be made before condensate has reached a threshold level. For example, if the controller closes the grille shutters in response to CAC condensate level above a threshold, the grille shutters may be closed before condensate has actually reached the threshold level.

A method for more accurately estimating humidity may improve the condensate model, allowing engine actuator adjustments in response to condensate to occur only when condensate levels in the CAC are actually high (e.g., during high humidity conditions). This method may include setting the humidity to a percentage, based on engine operating conditions. These conditions may include CAC efficiency and windshield wiper speed. CAC efficiency may be determined from CAC inlet an outlet temperatures. For example, at high efficiency levels, the humidity may be set to a higher percentage. In some embodiments, if CAC efficiency is above a threshold level, humidity may be assumed high and set to 100%. In other embodiments, high humidity may be confirmed by a windshield wiper on/off signal or windshield wiper speed. For example, if the wipers are on, or wiper speed is above a threshold speed, high humidity may be confirmed and set to 100%. In some examples, this percentage may be something lower than 100%. In yet another embodiment, wiper speed may be used alone to determine humidity for the condensate model. In this way, the humidity may increase as CAC efficiency and windshield wiper speed increase.

Vehicle speed may also influence the CAC efficiency. CAC efficiency estimates may be more accurate within a vehicle speed window. In one example, the temperature difference across the CAC under dry conditions may be compared to the temperature difference across the CAC during rainy or humid conditions at the same vehicle speed. An increase in CAC efficiency may then indicate a higher humidity condition. For example, during cruising conditions, the water evaporating off the outside of the CAC may increase efficiency. Comparing expected CAC temperatures to values when the wipers are operating may yield an increased temperature difference across the CAC due to an evaporation/convection effect. At lower vehicle speeds or idle, CAC efficiency estimates may be less accurate. Thus, when vehicle speed is below a threshold, wiper speed and/or operation alone may indicate rain and high humidity. When vehicle speed is above the threshold (where the threshold is greater than zero so that the vehicle is moving at least a threshold amount), in one embodiment only then is the CAC efficiency estimated based on the temperature difference.

In one embodiment, windshield wiper speed may be correlated and mapped to CAC efficiency. In this way, CAC efficiency may be based on windshield wiper speed, and vehicle speed. Specifically, a windshield wiper speed may correspond to a CAC efficiency value. For example, a fast wiper speed may correspond to a high CAC efficiency value. In this way, CAC efficiency may increase with increasing windshield wiper speed. A wiper speed threshold may then correspond to the CAC efficiency threshold. In this way, wiper speed may be used alone to infer a humidity value for calculating CAC condensate level and subsequently control engine actuators.

In an alternate embodiment, windshield wiper speed and/or CAC efficiency may be used to infer high humidity or rainy conditions and directly control engine actuators to increase or decrease CAC efficiency. For example, if CAC efficiency is high and high humidity is inferred, the controller may assume increased condensate formation. If CAC efficiency is above a threshold value, the controller may then adjust different engine actuators to control condensate formation in the CAC.

In response to CAC efficiency, wiper speed, and a level of condensate in the CAC, various engine operating parameters may be adjusted to control condensate formation. These operating parameters may control grille shutter opening, electric fan operation, variable volume CAC valves, downshifting operations, and CAC purging operations. In response to a CAC condensate level, the above systems may be adjusted and/or triggered. In one example, in response to condensate level above a threshold, the controller may decrease the opening of the grille shutters and/or decrease the rotation (or turn off) the electric fan. Alternatively or additionally, CAC purging operations may be initiated and involve increasing airflow through the CAC. Airflow may be increased by increasing the opening the throttle, adjusting variable volume CAC valves, or downshifting a transmission gear. Downshifting operations, including multiple gear downshifts, may also be controlled in response to condensate level. For example, in response to condensate above a threshold level, a multiple gear downshift may proceed through an intermediate gear. Specifically, the transmission may be downshifted from a higher gear to an intermediate gear and then to a requested lower gear. In this way, condensate may be purged from the CAC at a lower airflow rate at the intermediate gear before downshifting to the lower gear. Thus, the chance of engine misfire may be reduced.

In this way, in response to CAC efficiency, a humidity value may be set and then used to determine condensate formation in a charge air cooler. The CAC efficiency may be based on CAC inlet and outlet temperature. The humidity value may be set to a higher humidity value when CAC efficiency is greater than a threshold. The higher humidity value may be confirmed when windshield wiper speed is above a threshold speed. Alternatively, the humidity value may be set to a lower humidity value when CAC efficiency is less than the threshold. Condensate formation may include an amount (or level) of condensate in the CAC. This amount of condensate may then be used as a trigger for various control actions to adjust condensate formation in the CAC, such as adjusting one or more of a grille shutter system, an electric fan, and airflow through the CAC. Airflow through the CAC may be adjusted by one or more of increasing the opening of an intake throttle, adjusting a valve of a variable volume charge air cooler, and downshifting a transmission gear. The amount of condensate in the CAC may also be used to initiate charge air cooler condensate purging operations. The amount of condensate in the CAC may be further used to control transmission gear downshifting operations to reduce engine misfire. Additionally or alternatively, windshield wiper speed may be correlated to CAC efficiency within a vehicle speed envelope. CAC efficiency may then be estimated by windshield wiper speed and vehicle speed, or the efficiency may be updated/adjusted based on the windshield wiper speed and vehicle speed. Alternatively, the efficiency may be adjusted based on a rain sensor and vehicle speed.

Figure 2:
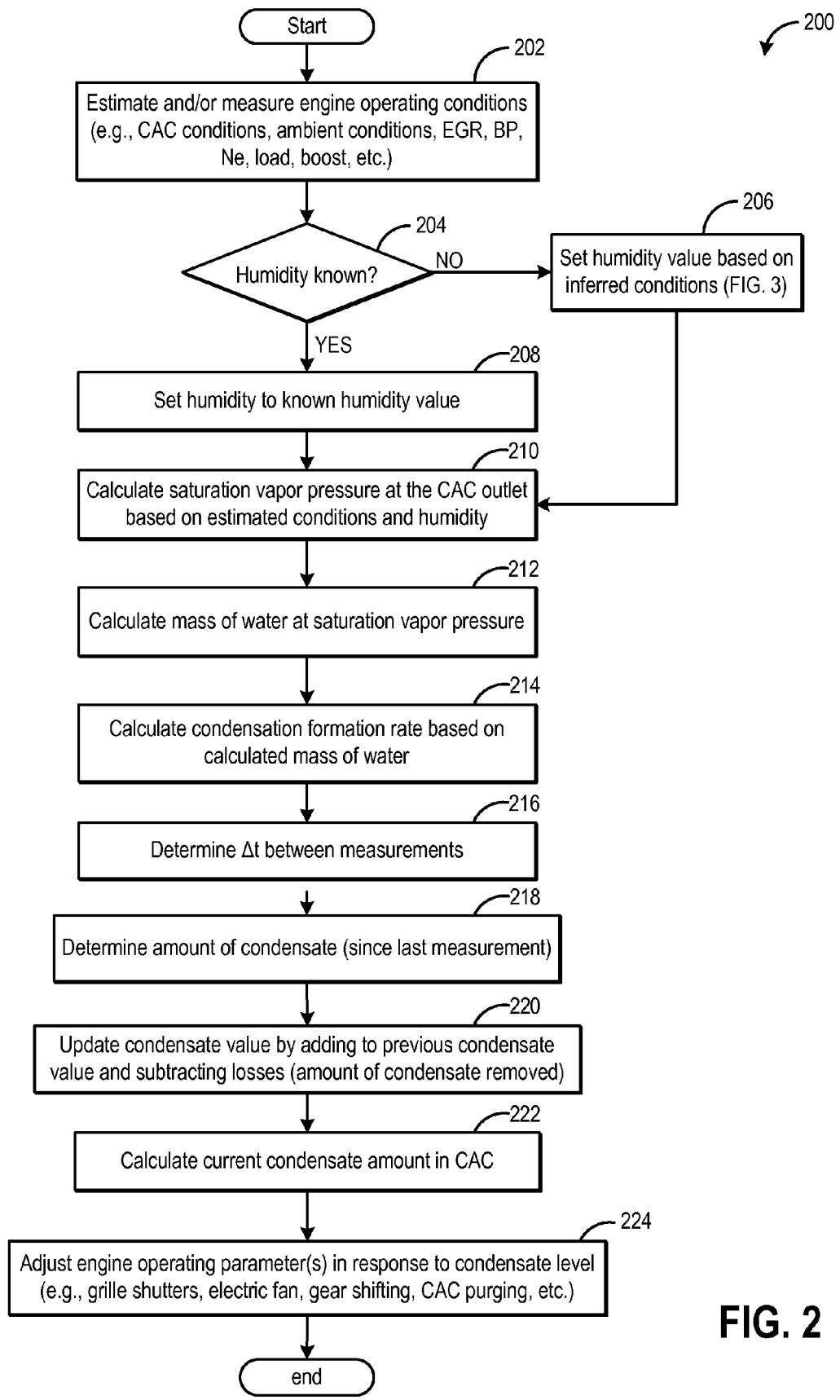
FIG. 2 shows a flow chart illustrating a method for determining a condensate level at the charge air cooler.

Turning now to FIG. 2, a method 200 for estimating the amount of condensate stored within the CAC is presented. Based on the amount of condensate at the CAC relative to a threshold value, different adjustments or routines to control CAC condensate may be initiated.

The method begins at 202 by determining the engine operating conditions. These may include, ambient conditions (e.g., ambient temperature and humidity), CAC conditions (e.g., inlet and outlet temperatures and pressures, flow rate through the CAC, etc.), air mass flow, MAP, EGR flow, engine speed and load, engine temperature, boost, etc. Next, at 204, the routine determines if the ambient humidity is known. In one example, the ambient humidity may be known based on the output of a humidity sensor coupled to the engine. In another example, humidity may be inferred from a downstream UEGO sensor or obtained from infotronics (e.g., internet connections, a vehicle navigation system, etc.) or a rain/wiper sensor signal. If the humidity is not known (for example, if the engine does not include a humidity sensor), the humidity may be set at 206 based on inferred conditions, as elaborated at FIG. 3. However, if the humidity is known, the known humidity value, as provided by the humidity sensor, may be used as the humidity setting at 208.

The ambient temperature and humidity may be used to determine the dew point of the intake air, which may be further affected by the amount of EGR in the intake air (e.g., EGR may have a different humidity and temperature than the air from the atmosphere). The difference between the dew point and the CAC outlet temperature, and the pressure in the CAC indicates whether condensation will form within the cooler, and the mass air flow may affect how much condensation actually accumulates within the cooler. At 210, an algorithm may calculate the saturation vapor pressure at the CAC outlet as a function of the CAC outlet temperature and pressure. The algorithm then calculates the mass of water at this saturation vapor pressure at 212. Finally, the condensation formation rate at the CAC outlet is determined at 214 by subtracting the mass of water at the saturation vapor pressure condition at the CAC outlet and the amount that stays entrained in the air stream from the mass of water in the ambient air. By determining the amount of time between condensate measurements at 216, method 200 may determine the amount of condensate within the CAC since a last measurement at 218. The current condensate amount in the CAC is calculated at 222 by adding the condensate value estimated at 218 to the previous condensate value and then subtracting any condensate losses since the last routine (that is, an amount of condensate removed. for example, via purging routines) at 220. Condensate losses may be assumed to be zero if the CAC outlet temperature was above the dew point. If the CAC outlet temperature is above the dewpoint some small fraction of evaporation may happen. Alternatively, at 220, the amount of condensate removed may be modeled or determined empirically as a function of air mass and integrated down with each software task loop (that is, with each run of routine 200).

At 224, in response to the amount or level of condensate determined at 222, the controller may adjust an engine operating parameter or parameters. Adjusting operating parameters may include adjusting one or more of a grille shutter system, an electric fan, and airflow through the CAC. Airflow through the CAC may be adjusted by one or more off increasing the opening of an intake throttle, adjusting a valve of a variable volume CAC, and downshifting a transmission gear. Adjusting the operating parameter may also include initiating CAC condensate purging operations and controlling transmission gear downshifting operations to reduce engine misfire. When CAC condensate level is above a threshold, operating parameters may be adjusted to decrease condensate formation. This may include decreasing the opening of grille shutters, decreasing the rotation speed of the electric fan, initiating purging routines, and controlling downshifting operations. In one example, if the condensate level found at 222 is over a threshold, one or more grilles shutters may be closed in response at 224. In another example, if the condensate level is above a threshold, the controller may increase airflow through the CAC by opening and intake throttle and purge condensate from the CAC. When CAC condensate is below the threshold, engine operating parameters may be adjusted in response to additional engine operating conditions (e.g., engine temperatures and engine driving conditions). For example, if the condensate level is below a threshold, the routine at 224 may increase electric fan speed if other engine operating conditions are met, such as engine temperatures being above an upper threshold. In this way, engine operating parameters may be adjusted in response to condensate formation in a CAC and the condensate formation may be based on ambient humidity, determined at FIG. 3.

Figure 3:
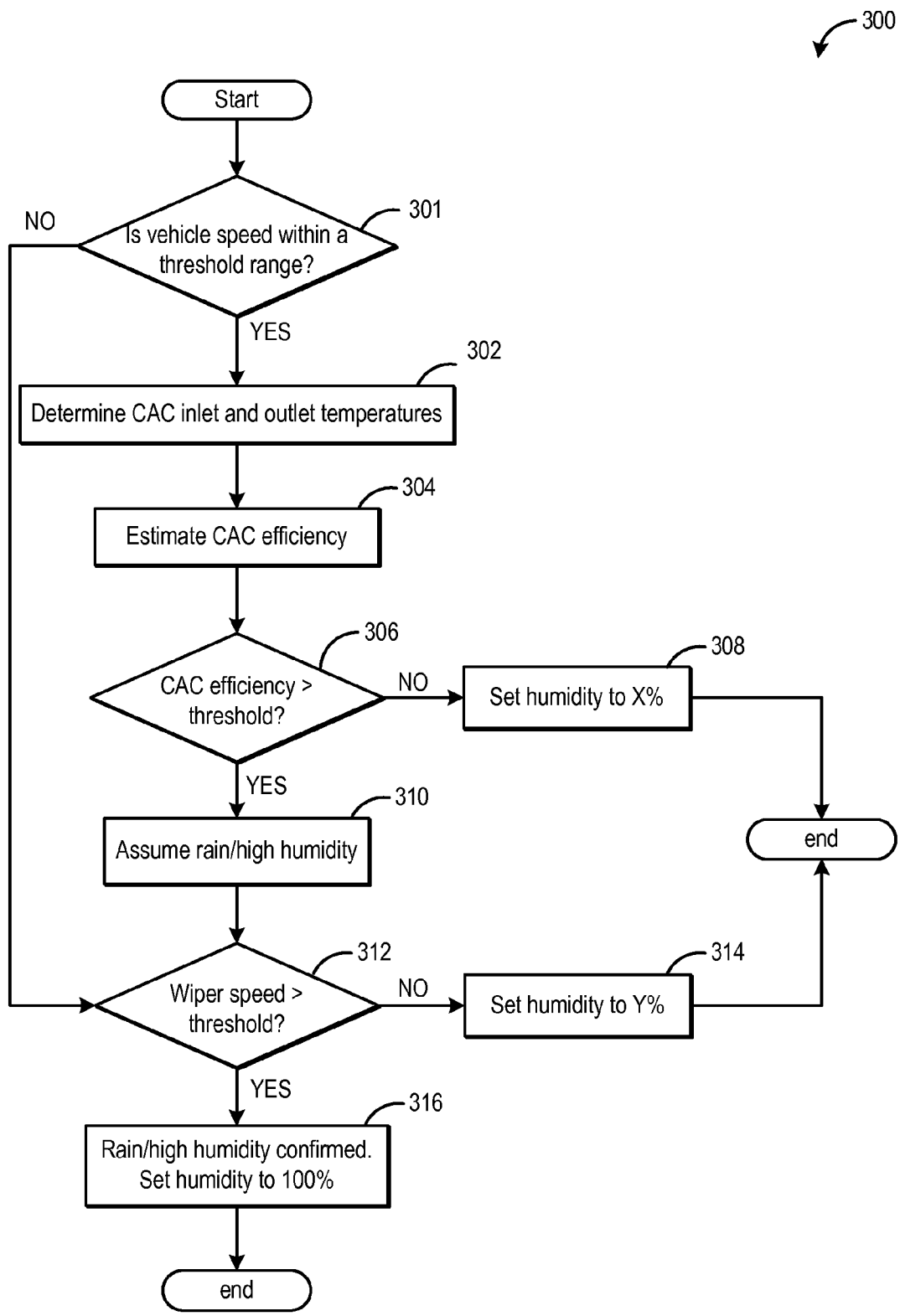
FIG. 3 presents a method for estimating a humidity value used in the condensate model.
Figure 4:
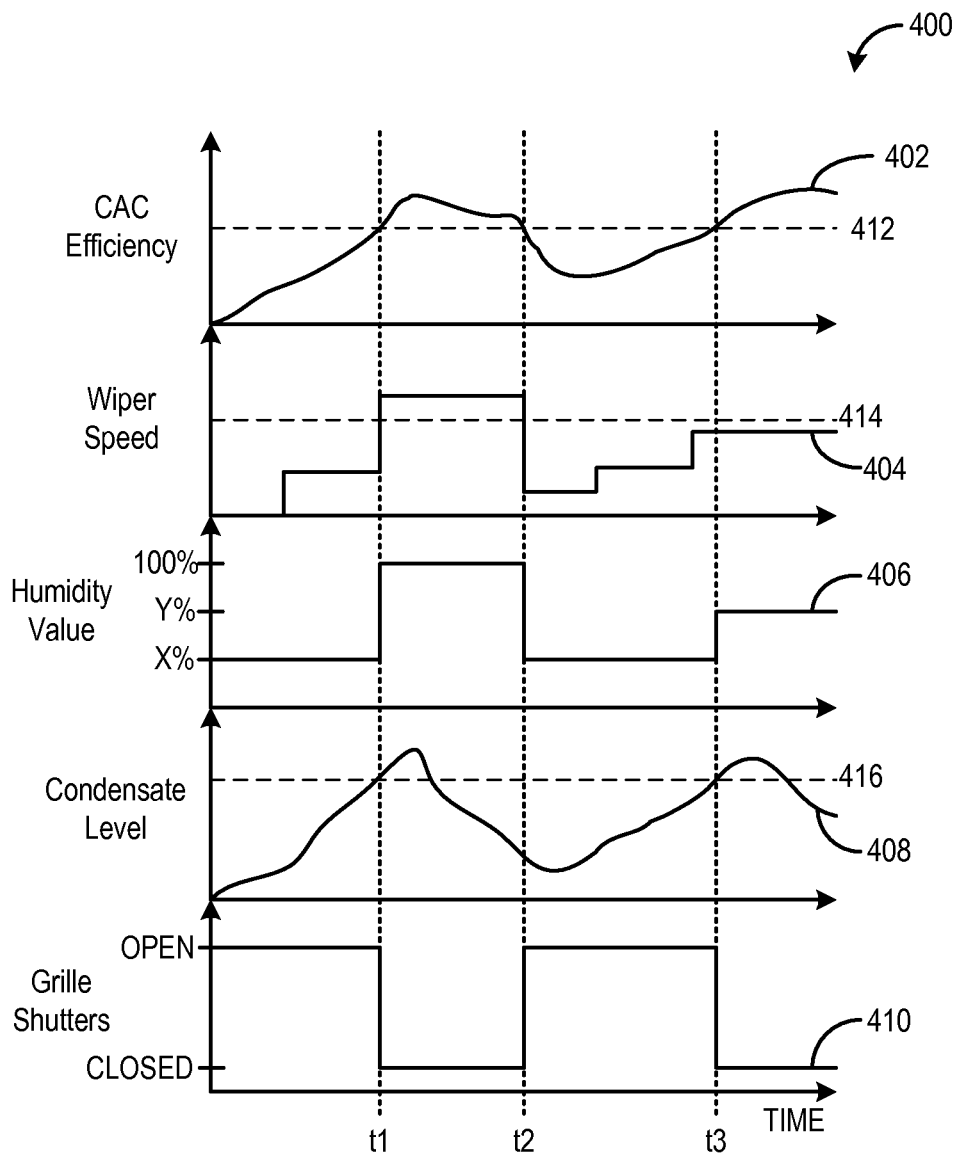
FIG. 4 shows example engine actuator adjustments in response to condensate levels, based on a humidity value inferred from CAC efficiency and wiper speed

FIG. 3 presents a method for estimating a humidity value used in the condensate model presented at FIG. 2. Humidity may be estimated from CAC efficiency and windshield wiper speed, along with vehicle speed. This information may then be used to determine condensate formation in the CAC and control other engine systems to reduce condensate formation and engine misfire. For example engine actuators may be adjusted to control condensate formation, purging operations, or shifting operations, as described above.

Method 300 begins at 301 where the controller determines if the vehicle speed is within an operating window. For example, the vehicle may need to be within a threshold range to accurately estimate CAC efficiency. In one example, vehicle speed may need to be above a threshold speed to estimate CAC efficiency. If vehicle speed is not within the threshold range, the routine continues on to 312 to assess windshield wiper operation (described further below). For example, if vehicle speed is less than a threshold speed, such as in an idle condition, humidity may be determined from windshield wiper operation.

However, if vehicle speed is within the threshold range, the routine continues on to 302 where the controller determines the inlet and outlet temperatures of the CAC. These temperatures may be used at 304 to estimate CAC efficiency by comparing to a known temperature differential under dry conditions at the same vehicle speeds. For example, a low CAC outlet temperature may indicate increased cooling of the CAC and a high CAC efficiency value. In another example, higher CAC outlet temperature may result in a lower CAC efficiency value. In this way, CAC efficiency may increase with decreasing CAC outlet temperature. If CAC efficiency is high, condensate formation in the CAC may be higher. During rainy or high humidity ambient conditions, CAC efficiency may increase, increasing condensate formation. Thus, high CAC efficiency values may indicate high humidity conditions. At 306, the routine determines if the CAC efficiency is greater than a threshold. If CAC efficiency is less than this threshold, humidity is set to a low humidity condition (or lower humidity value), X %, at 308. In one embodiment, this lower value may be 0%. In another embodiment, this value may be something smaller than 100% such as 40%. The higher humidity value may be based on an assessment of misfire risk due to condensate ingestion vs. an intrusive clean-out cycle. For example, if humidity is predicted too high, a clean-out cycle may be carried out unnecessarily, affecting vehicle drivability. Alternatively, if humidity is predicted too low, engine misfire may occur when ingesting increased condensate levels.

Returning to 306, if CAC efficiency is greater than the threshold, the routine may assume rain and/or high humidity. In some embodiments, the method may end here and set a higher humidity value or condition of substantially 100% for method 200. For example, this higher humidity value may be something greater than 95%. In other embodiments, as shown in method 300, the routine may continue on to 312 to determine if wiper speed is greater than a threshold speed. If the wiper speed is not greater than the threshold speed, the humidity value may be set to a lower humidity value, Y %, at 314. In one example, if the wipers have been on, but for less than the threshold speed or less than a threshold time, this percentage may be 90-95%. This percentage, Y %, may be something greater than 0% but less than the higher humidity value (e.g., 100%). In some examples, humidity value Y % may be greater than humidity X %. In other examples, humidity values X % and Y % may be the same. In yet another example, humidity value Y % may be 40% or some other value lower than the highest achievable pressure ratio to make condensation. For example, the lower humidity value may be determined by the highest possible internal CAC pressure ratios (CAC pressure/ambient pressure) to assure that no condensate may be formed. If wiper speed is greater than the threshold speed at 312, the rain/high humidity conditions is confirmed and may be set to substantially 100% at 316. This value is then used at 206 in method 200. In some embodiments, method 300 may only include inferring high humidity from wiper speed. In other embodiments, a wiper on signal, instead of wiper speed, may indicate high humidity and set the humidity value to the higher humidity value.

FIG. 4 illustrates example engine actuator adjustments in response to condensate levels, based on a humidity value inferred from CAC efficiency, wiper speed (e.g., windshield wiper speed), and vehicle speed. Specifically, graph 400 displays CAC efficiency at plot 402 and wiper speed at plot 404, used to determine the humidity value shown at plot 406. In an alternate example, a wiper on/off signal may be used instead of wiper speed at plot 404. Additionally, condensate level in the CAC, based on the humidity value, is shown at plot 408. In response to CAC condensate level (amount of condensate in the CAC), the controller may adjust or trigger different engine actuators or control routines. Specifically, graph 400 shows grille shutter adjustments at plot 410, in response to condensate level. In other examples, the controller may adjust other engine controls, including electric fan operation, the position of an intake throttle, the valve position of a variable volume CAC, and downshifting of a transmission gear.

Prior to time t1, the grille shutters are open (plot 410) and CAC efficiency (plot 402) and wiper speed (plot 404) are increasing. As a result, CAC condensate level (plot 408) is slowly increasing. Since CAC efficiency and wiper speed are below a threshold level 412 and threshold speed 414, respectively, the humidity value is at X %. In some examples, X % may be 0% humidity. In another examples, X % may be something greater than 0% but less than 100%. At time t1, CAC efficiency increases above threshold level 412 (plot 402) and wiper speed increases above threshold speed 414 (plot 404). In response, the humidity value may be set to 100% and used to calculate the condensate level in the CAC. Using 100% humidity in the condensate model presented at FIG. 2, the condensate level may be calculated to be above threshold level 416 at time t1. In response to CAC condensate above threshold level 416, the controller may close the grille shutters to reduce the CAC efficiency and decrease condensate formation. Additionally or alternatively, other engine controls may be initiated in response to condensate above threshold level 416.

Between time t1 and time t2, condensate level in the CAC decreases. At time t2, CAC efficiency decreases below a threshold level 412 (plot 402) and wiper speed decreases below threshold speed 414 (plot 404). Note that the threshold may include hysteresis. As a result, the humidity value is set to X % (plot 406) and condensate level continues to decrease (plot 408). In response to other engine parameters, the controller may open the grill shutters at time t2 (plot 410). Between time t2 and time t3, CAC efficiency (plot 402), wiper speed (plot 404), and condensate level (plot 416) may increase. At time t3, CAC efficiency increases above threshold level 412, while wiper speed remains just below threshold speed 414. As a result, the humidity value is set to Y % (plot 406). Condensate level increases above threshold level 416, causing the grille shutters to close (plot 410).

In this way, a humidity value used to determine condensate formation in a CAC may be estimated from CAC efficiency and windshield wiper speed. CAC efficiency may be determined from CAC inlet and outlet temperature, when vehicle speed is in a threshold range, and then compared to a threshold. A high humidity value may be set when CAC efficiency is greater than the threshold and a low humidly value may be set when CAC efficiency is less than the threshold. A windshield wiper speed above a threshold speed may confirm the high humidity condition. The humidity value may be used in a condensate model to determine an amount of CAC condensate. In response to a CAC condensate level (or amount), other engine systems may be controlled to reduce condensate formation and engine misfire. In this way, a more accurate estimation of ambient humidity may improve the accuracy of the condensate model and optimize controls for condensate and engine misfire reduction.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. A method comprising:
adjusting an operating parameter in response to an estimated amount of condensate in a charge air cooler; and
determining the estimated amount of condensate based on each of ambient humidity, ambient temperature, outlet temperature of the charge air cooler, a pressure in the charge air cooler, and mass air flow through the charge air cooler, the ambient humidity determined based on a charge air cooler efficiency value.

2. The method of claim 1, wherein the charge air cooler efficiency value is determined based on charge air cooler inlet and outlet temperature when vehicle speed is above a threshold moving speed.

3. The method of claim 2, wherein the ambient humidity is estimated to a higher humidity value when the charge air cooler efficiency value is greater than a threshold and to a lower humidity value when the charge air cooler efficiency value is less than the threshold.

4. The method of claim 3, wherein the ambient humidity is estimated to the higher humidity value when windshield wiper speed is above a threshold speed.

5. The method of claim 3, wherein the higher humidity value is substantially 100% and the lower humidity value is less than the higher humidity value.

6. The method of claim 2, wherein the operating parameter is adjusted responsive to the estimated amount of condensate being greater than a threshold level.

7. The method of claim 6, wherein adjusting the operating parameter includes adjusting one or more of a grille shutter system, an electric fan, and airflow through the charge air cooler.

8. The method of claim 7, wherein airflow through the charge air cooler is adjusted by one or more of increasing an opening of an intake throttle, adjusting a valve of a variable volume charge air cooler, and downshifting a transmission gear.

9. The method of claim 2, wherein adjusting the operating parameter includes initiating charge air cooler condensate purging responsive to the estimated amount of condensate in the charge air cooler, wherein initiating condensate purging includes increasing airflow through the charge air cooler to strip condensate from inside the charge air cooler and into an engine.

10. The method of claim 1, wherein adjusting the operating parameter includes controlling transmission gear downshifting operations to reduce engine misfire responsive to the estimated amount of condensate in the charge air cooler.

11. The method of claim 1, wherein the charge air cooler efficiency value is estimated based on windshield wiper speed.

12. The method of claim 11, wherein windshield wiper speed is further correlated to the charge air cooler efficiency value and a wiper speed threshold is used to estimate a humidity value for calculating the amount of condensate in the charge air cooler and subsequently controlling the operating parameter.

13. A method for an engine, comprising:
during a first condition, when a charge air cooler efficiency value is greater than a threshold, setting a high humidity condition, determining a charge air cooler condensate level based on each of the high humidity condition, ambient temperature, outlet temperature of the charge air cooler, a pressure in the charge air cooler, and mass air flow through the charge air cooler, and adjusting engine operating parameters in response to the determined condensate level and;
during a second condition, when the charge air cooler efficiency value is less than a threshold, setting a low humidity condition, determining a charge air cooler condensate level based on each of the low humidity condition, ambient temperature, outlet temperature of the charge air cooler, the pressure in the charge air cooler, and mass air flow through the charge air cooler, and adjusting engine operating parameters in response to the determined condensate level, where the condensate level is an amount of condensate in the charge air cooler.

14. The method of claim 13, wherein the high humidity condition is 100% and the low humidity condition is less than 100%.

15. The method of claim 13, wherein the engine operating parameters include one or more of a grille shutter system, an electric fan, a variable volume charge air cooler, charge air cooler purging operations, a throttle opening to control air flow rate, and downshifting operations.

16. The method of claim 13, further comprising in response to windshield wiper speed over a threshold, confirming the high humidity condition.

17. The method of claim 13, wherein the charge air cooler efficiency value is estimated based on vehicle speed within a threshold range and one of temperature at a charge air cooler inlet and outlet and windshield wiper speed.

18. The method of claim 17, wherein the charge air cooler efficiency value increases with decreasing charge air cooler outlet temperature and increasing windshield wiper speed.

19. A method for an engine, comprising:

determining an estimated amount of condensate in a charge air cooler based on each of ambient humidity, ambient temperature, outlet temperature of the charge air cooler, a pressure in the charge air cooler, and mass air flow through the charge air cooler; and adjusting an operating condition responsive to the estimated amount of condensate, the ambient humidity determined based on a charge air cooler efficiency value and a windshield wiper condition.

20. The method of claim 19, wherein the adjusting includes reducing condensate formation by one or more of decreasing an opening of a grille shutter system, decreasing a rotation speed of an electric fan, initiating purging routines, controlling downshifting operations, and controlling mass air flow rate with a rate of throttle opening, and wherein the determined ambient humidity increases as the charge air cooler efficiency value and windshield wiper speed increase.

* * * * *